United States Patent
Sumi

(10) Patent No.: US 11,142,646 B2
(45) Date of Patent: Oct. 12, 2021

(54) VEHICLE HEADLIGHT ASSEMBLY

(71) Applicant: E I DU PONT DE NEMOURS AND COMPANY, Wilmington, DE (US)

(72) Inventor: Hiroyuki Sumi, Tochigi (JP)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 1 day.

(21) Appl. No.: 16/084,286

(22) PCT Filed: Mar. 20, 2017

(86) PCT No.: PCT/US2017/023141
§ 371 (c)(1),
(2) Date: Sep. 12, 2018

(87) PCT Pub. No.: WO2017/165263
PCT Pub. Date: Sep. 28, 2017

(65) Prior Publication Data
US 2019/0079562 A1    Mar. 14, 2019

Related U.S. Application Data

(60) Provisional application No. 62/311,531, filed on Mar. 22, 2016.

(51) Int. Cl.
*C09B 67/08* (2006.01)
*C09B 67/46* (2006.01)
(Continued)

(52) U.S. Cl.
CPC ............ *C09B 67/0013* (2013.01); *C08K 5/00* (2013.01); *C08K 5/3437* (2013.01); *C09B 5/60* (2013.01);
(Continued)

(58) Field of Classification Search
CPC .... G06F 1/1616; G06F 1/1679; G06F 1/1681; F21S 43/00; C09B 67/0013;
(Continued)

(56) References Cited

U.S. PATENT DOCUMENTS 6,355,723 B1 * 3/2002 van Baal ................. F21S 41/37
524/602
6,476,158 B1 * 11/2002 England ................. C08L 67/02
524/537

(Continued)

FOREIGN PATENT DOCUMENTS

JP    2019-518086 A    6/2019
WO    02/59191 A2    8/2002
(Continued)

OTHER PUBLICATIONS

Extended European Search Report, 17770884.9, EPO, dated Nov. 21, 2019.
(Continued)

*Primary Examiner* — Thomas M Sember

(57) ABSTRACT

This invention relates to a vehicle headlight assembly comprising: a light source, a housing supporting the light, a bezel equipped over the front side of the housing, and a transparent cover being equipped over the front side of the bezel, wherein the bezel and optionally the housing comprises a thermoplastic resin and a colorant, wherein the colorant is selected from the group consisting of an anthraquinone dye, an amine salt thereof and a mixture thereof.

10 Claims, 1 Drawing Sheet

(51) Int. Cl.
  *C09B 5/60* (2006.01)
  *C08K 5/00* (2006.01)
  *C08K 5/3437* (2006.01)
  *C09B 67/22* (2006.01)
  *G06F 1/16* (2006.01)
  *C08K 5/08* (2006.01)
  *C08L 77/00* (2006.01)
  *C08K 5/3465* (2006.01)
  *C08K 5/375* (2006.01)

(52) U.S. Cl.
  CPC ........ *C09B 67/009* (2013.01); *C09B 67/0038* (2013.01); *G06F 1/1616* (2013.01); *G06F 1/1679* (2013.01); *G06F 1/1681* (2013.01); *C08K 5/0041* (2013.01); *C08K 5/08* (2013.01); *C08K 5/3465* (2013.01); *C08K 5/375* (2013.01); *C08L 77/00* (2013.01)

(58) Field of Classification Search
  CPC ..... C09B 67/009; C09B 67/0038; C09B 5/60; C08K 5/00; C08K 5/3437
  See application file for complete search history.

(56) References Cited

U.S. PATENT DOCUMENTS 6,893,147 B2* 5/2005 Schottland ............... F21V 3/04
  362/510
2010/0227183 A1 9/2010 Dobrick et al.

FOREIGN PATENT DOCUMENTS

| WO | 03/86813 A2 | 10/2003 |
| WO | WO 03099939 | * 12/2003 |
| WO | 2005/040674 A1 | 5/2005 |
| WO | 2008/005899 A2 | 1/2008 |
| WO | 2008/008599 A2 | 1/2008 |
| WO | 2013/115903 A1 | 8/2013 |
| WO | 2014/108867 A1 | 7/2014 |

OTHER PUBLICATIONS

International Search Report in Application No., PCT/US2017/023141, dated Jul. 4, 2017.

* cited by examiner

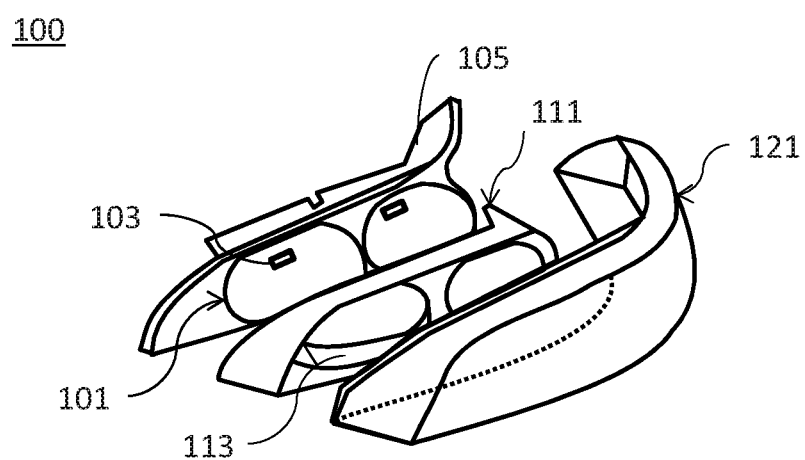

VEHICLE HEADLIGHT ASSEMBLY

CROSS-REFERENCES TO RELATED APPLICATIONS

This application claims priority under 35 U.S.C. §§ 365 and 371 to International Application No. PCT/US2017/023141, filed on Mar. 20, 2017, which in turn claims priority to U.S. Provisional Appln. No. 62/311,531, filed on Mar. 22, 2016, each of which is incorporated herein by reference in its entirety.

FIELD OF THE INVENTION

The invention relates to a vehicle, more specifically to a vehicle headlight assembly used thereof.

TECHNICAL BACKGROUND OF THE INVENTION

A vehicle headlight assembly contains a light, a housing, a bezel and a cover. Usually a bezel is metal color to reflect light from a light source and sunlight. The other colors of vehicle headlight are required for a variety of designs.

US2010227183 discloses an automotive headlight extensions, bezels and reflectors that are made from a composition comprising poly(trimethylene terephthalate), trisodium phosphate, a pentaerythritol tetramontanate mold release lubricant and a carbon black. The surface of the bezel is plated with a metal coating.

BRIEF SUMMARY OF THE INVENTION

An objective is to provide a vehicle headlight assembly with sufficient heat resistance.

An aspect of the invention relates to A vehicle headlight assembly comprising: a light source, a housing supporting the light, a bezel equipped over the front side of the housing, and a transparent cover being equipped over the front side of the bezel, wherein the bezel and optionally the housing comprises a thermoplastic resin and a colorant, wherein the colorant is selected from the group consisting of an anthraquinone dye, an amine salt thereof and a mixture thereof.

Another aspect of the invention relates to a vehicle bezel comprising a thermoplastic resin and a colorant, wherein the colorant is selected from the group consisting of an anthraquinone dye, an amine salt thereof and a mixture thereof.

Another aspect of the invention relates to a method of manufacturing a vehicle headlight assembly comprising steps of:
preparing a thermoplastic resin composition comprising a thermoplastic resin and a colorant, wherein the colorant is selected from the group consisting of an anthraquinone dye, an amine salt thereof and a mixture thereof;
forming a bezel by injection molding the resin composition;
equipping the bezel on the front side of a housing holding a light; and equipping a transparent cover on the front side of the bezel.

A vehicle headlight assembly with heat resistance can be provided by the present invention.

BRIEF DESCRIPTION OF THE DRAWINGS

FIG. 1 depicts one embodiment of a vehicle headlight assembly.

DETAILED DESCRIPTION OF THE INVENTION

The vehicle headlight assembly comprises a light, a housing, a bezel and a transparent cover. FIG. 1 illustrates one example of the vehicle headlight assembly 100. The housing 105 holds a light 101. The light 101 contains at least one light source 103. The bezel 111 is equipped on the front side of the housing 105. "Front side" is a side facing toward the front of the vehicle. The bezel 111 has holes 113 that the lights 101 fit in. The transparent cover 121 is equipped on the front side of the bezel 111 to cover the lights 113. The bezel 111 and optionally the housing 105 are colored in dark color in an embodiment, dark blue in another embodiment, dark green in another embodiment, dark violet in another embodiment, black in another embodiment. The bezel 111 and optionally the housing 105 are not plated with a metal in another embodiment.

The bezel 111 and optionally the housing 105 comprise a thermoplastic resin and a colorant, wherein the colorant is selected from the group consisting of an anthraquinone dye, an amine salt thereof and a mixture thereof.

The bezel 111 and optionally the housing 105 are formed by injection molding a resin composition in an embodiment. The resin composition comprises the thermoplastic resin and the colorant.

Thermoplastic Resin

There is no restriction on the thermoplastic resin. A wide range of thermoplastic resin useful for molding is available. The black colorant is dispersed into the thermoplastic resin to form a resin composition.

The thermoplastic resin can comprise polyamide, polyester, polyphenylene sulfide, polyacetal, polycarbonate, polysulfone, polyethylene, polyether sulfone, methacrylate, polyamide-imide, fluoroplastic and a mixture thereof in an embodiment. The thermoplastic resin can comprise polyamide, polyester and a mixture thereof in another embodiment. The thermoplastic resin can comprise polyester in another embodiment.

The polyamide resin can comprise a condensation product of dicarboxylic acids and diamines, a condensation product of aminocarboxylic acids and ring-opening polymerization products of cyclic lactams in an embodiment.

The dicarboxylic acids of polyamide can be adipic acid, azelaic acid, sebacic acid, dodecanedioic acid, isophthalic acid and terephthalic acid in an embodiment. The diamine can be tetramethylene diamine, hexamethylene diamine, octamethylene diamine, nonamethylene diamine, dodecamethylene diamine, 2-methylpentamethylene diamine, 2-methyloctamethylene diamine, trimethylhexamethylene diamine, bis(p-aminocyclohexyl)methane, m-xylene diamine and p-xylene diamine in an embodiment. The aminocarboxylic acid can be 11-aminododecanoic acid in an embodiment. The cyclic lactam can be caprolactam or laurolactam in an embodiment.

The condensation products and ring-opening polymerization products can be aliphatic polyamide, semi-aromatic polyamide, copolymer thereof or a mixture thereof in another embodiment. The thermoplastic resin can comprise nylon 6, nylon 66, nylon 46, nylon 610, nylon 612, nylon 11, and nylon 12, polymetaxylene adipamide (nylon MXD6), polyhexamethylene terephthalamide (nylon 6T), polyhexamethylene isophthalamide (nylon 6I) a polynonamethylene terephthalamide (nylon 9T), nylon 6/66, nylon 66/6I, nylon 6I/6T, nylon 66/6T or a mixture thereof in another embodiment.

The thermoplastic resin can comprise polyester in another embodiment. The polyester is condensation products of dicarboxylic acids and diols. Dicarboxylic acids of polyester can be selected from the group consisting of adipic acid, azelaic acid, sebacic acid, dodecanedioic acid, terephthalic acid, isophthalic acid, naphthalenedicarboxylic acid and diphenyl dicarboxylic acid in an embodiment. Diols can be selected from the group consisting of ethylene glycol, propylene glycol, butanediol, hexanediol, neopentyl glycol, cyclohexanediol, and bisphenol A in an embodiment.

The polyester can be selected from the group consisting of polyethylene terephthalate (PET), polybutylene terephthalate (PBT), Polytrimethylene terephthalate (PTT), polyethylene 2,6-naphthalate (PEN), polybutylene naphthalate (PBN), polycyclohexane dimethylene terephthalate (PCT), a copolymer thereof and a mixture thereof in an embodiment. As the examples of the copolymers, some of dicarboxylic acids or some of diols can be added to the condensation products. Polyester may be copolymerized a little amount of components like trimesic acid, trimellitic acid, pyromellitic acid, glycerol, and pentaerythritol which have more than three functional groups in another embodiment.

Colorant

The colorant is selected from the group consisting of an anthraquinone dye, an amine salt thereof and a mixture thereof. Anthraquinone is an aromatic organic compound with formula $C_{14}H_8O_2$. The anthraquinone dye is anthraquinone or a derivative of anthraquinone.

The anthraquinone dye absorbs the visible light region at less than 700 nm and transmits the light of infra-red region at 800 to 1200 nm in an embodiment.

The anthraquinone dye can be selected from the group consisting of an anthraquinone green dye, an anthraquinone blue dye, an anthraquinone violet dye, an anthraquinone red dye, an anthraquinone orange dye, an anthraquinone yellow dye and a mixture thereof in another embodiment. The anthraquinone dye can be selected from the group consisting of an anthraquinone green dye, an anthraquinone blue dye, an anthraquinone violet dye, an anthraquinone yellow dye and a mixture thereof in another embodiment.

The anthraquinone green dye can be selected from the group consisting of C.I. Solvent Green 3, 5, 6, 7, 19, 20, 22, 23, 24, 25, 26, 28, 29 and a mixture thereof in another embodiment.

The anthraquinone blue dye can be selected from the group consisting of C.I. Solvent Blue 11, 12, 13, 14, 16, 17, 18, 19, 20, 21, 35, 36, 40, 41, 45, 58, 59, 63, 65, 68, 69, 74, 76, 78, 79, 80, 82, 83, 84, 85, 86, 87, 90, 91, 92, 93, 94, 95, 96, 97, 98, 101, 102, 103, 104, 105, 106, 107, 108, 109, 110, 111, 112, 113, 114, 116, 119, 120, 121, 122, 123, 126, 128, 130, 132, 134, 136, 139, C.I. Vat Blue 4, 6, 11, 12, 13, 14 and a mixture thereof in another embodiment.

The anthraquinone violet dye can be selected from the group consisting of C.I. Solvent Violet 11, 12, 13, 14, 15, 26, 28, 30, 31, 33, 34, 36, 37, 38, 40, 41, 42 and a mixture thereof in another embodiment.

The anthraquinone red dye can be selected from the group consisting of C.I. Solvent Red 52, 57, 111, 114, 136, 137, 138, 139, 143, 144, 145, 146, 147, 148, 149, 150, 151, 152, 155, 156, 168, 169, 170, 171, 172, 177, 181, 190, 191, 194, 199, 200, 201 and a mixture thereof in another embodiment.

The anthraquinone orange dye can be selected from the group consisting of C.I. Solvent Orange 35, 55, 64, 65, 66, 68, 69, 71, 77, 86, 87, 163 and a mixture thereof in another embodiment.

The anthraquinone yellow dye can be selected from the group consisting of C.I. Solvent Yellow 100, 109, 117, 125, 156, 158, 163 or C.I. Vat Yellow 1, 2, 3 and a mixture thereof in another embodiment.

The anthraquinone dye can be represented by the following formula [I], formula [II-a] or formula [II-b] in another embodiment.

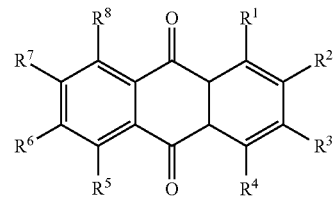

Formula [I]

wherein $R^1$ to $R^8$ is independently H, OH, $NH_2$, $OCH_3$, $OCH_3$, $CH_3NH$, $C_4H_9NH$, $C_5H_{11}NH$, Br, $NOC_2H_4NH$, methylanilino, aniline, benzoylamido, ethylanilino, cyclohexyl amido or phenyloxy.

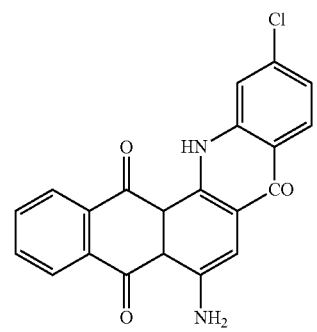

Formula [II-a]

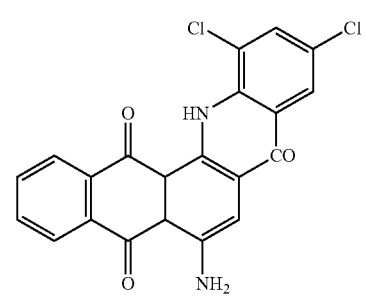

Formula [II-b]

Examples of anthraquinone dye of formula [I] are shown below.

TABLE 1

| $R^1$, $R^2$, $R^3$, $R^4$, $R^5$, $R^6$, $R^7$, $R^8$ |
|---|
| $R^2 = R^3 = R^4 = R^5 = R^6 = R^7 = R^8 = $ H, $R^1 = $ methylanilino |
| $R^2 = R^3 = R^5 = R^6 = R^7 = R^8 = $ H, $R^4 = $ OH, $R^1 = $ methylanilino |
| $R^2 = R^3 = R^5 = R^6 = R^7 = R^8 = $ H, $R^4 = NH_2$, $R^1 = $ anilino |
| $R^2 = R^3 = R^5 = R^6 = R^7 = R^8 = $ H, $R^4 = OCH_3$, $R^1 = $ benzoylamido |
| $R^2 = R^3 = R^5 = R^6 = R^7 = R^8 = $ H, $R^1 = R^4 = NH_2$ |
| $R^2 = R^3 = R^5 = R^6 = R^7 = R^8 = $ H, $R^4 = NH_2$, $R^1 = $ cyclohexyl amido |
| $R^2 = R^3 = R^5 = R^6 = R^7 = R^8 = $ H, $R^4 = NH_2$, $R^1 = CH_3NH$ |
| $R^2 = R^3 = R^5 = R^6 = R^7 = R^8 = $ H, $R^1 = R^4 = C_4H_9NH$ |

An amine salt of an anthraquinone dye can also be used as a colorant. The colorant can comprise a mixture of an anthraquinone dye and an amine salt of an anthraquinone dye in another embodiment. The colorant can comprise amine salt of an anthraquinone dye without an anthraquinone dye in another embodiment. The amine salt of an anthraquinone dye comprises anthraquinone or an anthraquinone derivative and amine salt. The amine salt is a salt formed from amino compound and acid. The amine salt of an anthraquinone dye has transmittance at a wavelength of 800 nm to 1200 nm in an embodiment.

The amine salt of an anthraquinone dye can be represented by the following formula [III] or formula [IV] in another embodiment.

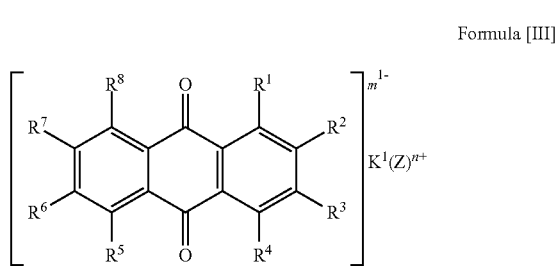

Formula [III]

wherein $R^1$ to $R^8$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamine, sulfonyl, formula [1-a], or —Y—W, and at least one of $R^1$ to $R^8$ is of formula [III-a]; wherein Y is S, O, or NH; wherein W is selected from unsubstituted or substituted alkyl group, alkenyl group, and unsubstituted or substituted aryl group; wherein $(Z)^{n+}$ represents ammonium ion or a cation derived from an organic amine compounds or a basic dye; wherein n is 1 or 2, m1 is an integer from 1 to 4 and K1 is the ratio of m1/n; and wherein formula [III-a] is:

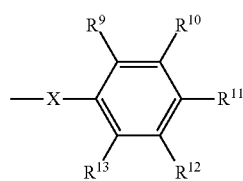

wherein X is O or NH, and $R^9$ to $R^{13}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl; wherein at least one of $R^1$ to $R^8$ and $R^9$ to $R^{13}$ is sulfonyl group.

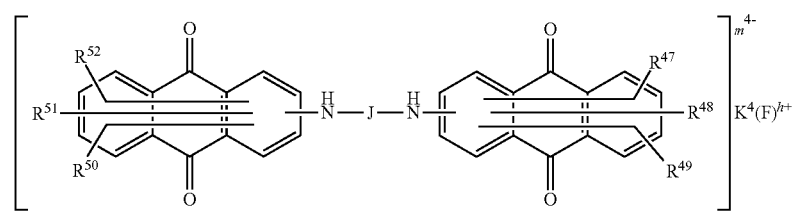

Formula [IV]

wherein $R^{47}$ to $R^{52}$, which may be the same or different, are independently selected from the group consisting of H, alkyl, aryl, alkenyl, alkoxy, amino, Nalkylamide, N-arylamide, hydroxy, halogen atom, acyl, acyloxy, acylamide, acyl-Nalkylamide, carboxyl, alkoxycarbonyl, or sulfonyl, and at least one of $R^{47}$ to $R^{52}$ is of sulfonyl; $(F)^{h+}$ represents ammonium ion or a cation derived from an organic amino compounds or a basic dye wherein h is 1 or 2, $m^4$ is an integer from 1 to 4 and $K^4$ is the ratio of $m^4/h$; J is following formula [IV-a] or formula [IV-b].

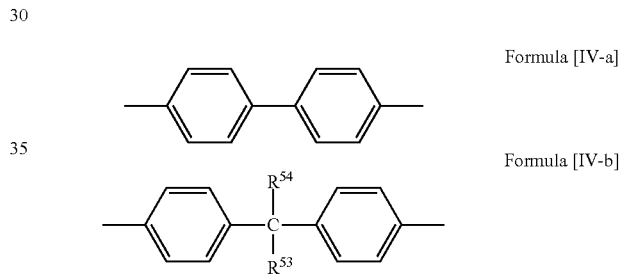

Formula [IV-a]

Formula [IV-b]

wherein $R^{53}$ to $R^{54}$, which may be the same or different, are independently selected from the group consisting of alkyl (having 1 to 8 carbon atoms) or hydrogen.

Amine of the amine salt can be selected from the group consisting of aliphatic amine, alicyclic amine, alkoxyalkyl amine, amine having alkanol, diamine, amine of guanidine derivatives and aromatic amine in another embodiment.

The amine salt of an anthraquinone dye, as listed in the color index, can be selected from the group consisting of C.I. basic green dye, C.I. basic blue dye, C.I. basic violet dye, C.I. basic red dye and a mixture thereof in another embodiment.

C.I. basic green dye can be selected from the group consisting of C.I. basic green 1, 3, 4, 6, 9, 10 and a mixture thereof in an embodiment.

C.I. basic blue dye: C.I. basic blue 1, 2, 3, 4, 5, 6, 7, 8, 9, 10, 11, 12, 13, 14, 15, 18, 20, 21, 22, 23, 24, 25, 26, 35, 36, 37, 45, 46, 47, 49, 50, 55, 56, 60, 62, 67, 75, 77, 79, 80, 81, 83, 87, 88, 89, 90, 94, 95, 96, 97 and a mixture thereof in an embodiment.

C.I. basic violet dye: C.I. basic violet 1, 2, 3, 4, 5, 6, 7, 8, 10, 11, 12, 13, 14, 15, 16, 17, 20, 21, 23, 24, 25, 27, 40 and a mixture thereof in an embodiment.

C.I. basic red dye: C.I. basic red 1, 2, 3, 4, 5, 6, 8, 9, 10, 11, 12, 13, 15, 16, 17, 19, 20, 26, 27, 35, 36, 37, 48, 49, 52, 53, 54, 66, 68 and a mixture thereof in an embodiment.

Examples of the amine salt anthraquinone dye of formula [III] are given below in Table 2.

TABLE 2

| $R^1, R^2, R^3, R^4, R^5, R^6, R^7, R^8$ | $K^1(Z)^{n+}$ |
|---|---|
| $R^2 = R^5 = R^6 = R^7 = R^8 = H, R^4 = OH, R^1 = R^3 =$ Formula [III-a]: $X = NH, R^{11} = NO2, R^9 = SO_3^-, R^{10} = R^{12} = R^{13} = H$ | Rosin anmmonium |
| $R^2 = R^3 = R^5 = R^6 = R^7 = R^8 = H, R^4 = OH, R^1 =$ Formula [III-a]: $X = NH, R^{11} = CH_3, R^9 = SO_3^-, R^{10} = R^{12} = R^{13} = H$ | $H_3N + ((CH_2)_6NH$ |
| $R^2 = R^3 = R^5 = R^6 = R^7 = R^8 = H, R^1 =$ Formula [III-a], $R^4 = Y - W$: $X = NH, R^{11} = CH_3, R^9 = SO_3^-, R^{10} = R^{12} = R^{13} = H, Y = NH, W = CH_3$ | $C_{12}H_{25}N + H_3$ |
| $R^2 = R^3 = R^5 = R^6 = R^7 = R^8 = H, R^1 = R^4 =$ Formula [III-a]: $X = NH, R11 = CH_3, R^9 = SO_3H, R^{10} = R^{12} = R^{13} = H$ | $(C_4H_9)_4N+$ |
| $R^2 = R^3 = R^5 = R^6 = R^7 = R^8 = H, R^1 = R^4 =$ Formula [III-a]: $X = NH, R^9 = R^{11} = R^{13} = CH_3, R^{12} = SO_3H, R^{10} = H$ | $H_3N + ((CH_2)_6NH_2$ |
| $R^2 = R^3 = R^5 = R^6 = R^7 = R^8 = H, R^1 = R^4 =$ Formula [III-a]: $X = NH, R^{11} = CH3, R^9 = SO_3^-, R^{10} = R^{12} = R^{13} = H$ | $(N + H_3)_2CNH$ |
| $R^2 = R^3 = R^5 = R^6 = R^7 = R^8 = H, R^1 = R^4 =$ Formula [III-a]: $X = NH, R^{11} = C_4H_9, R^9 = SO_3H, R^{10} = R^{12} = R^{13} = H$ | $H_3N + (CH_2)_6NH_2$ |

Examples of the amine salt anthraquinone dye of formula [IV] are given in Table 3 below.

TABLE 3

| J | $R^{47}$ | $R^{48}$ | $R^{49}$ | $R^{50}$ | $R^{51}$ | $R^{52}$ | $K^4(F)^{h+}$ |
|---|---|---|---|---|---|---|---|
| Formula [IV-a] | $SO_3^-$ | $NH_2$ | H | $SO_3^-$ | $NH_2$ | H | $2(H_3N^+(CH_2)_6NH_2)$ |
| Formula [IV-a] | $SO_3^-$ | $NH_2$ | H | $SO_3H$ | $NH_2$ | H | $H_3N^+(CH_2)_6NH_2$ |
| Formula [IV-a] | $SO_3^-$ | OH | H | $SO_3H$ | OH | H | $C_{12}H_{25}N^+H_3$ |
| Formula [IV-b], $R^{53} = R^{54} = H$ | $SO_3^-$ | $NH_2$ | H | $NH_2$ | Cl | H | $C_2H_5OC_3H_6N^+H_3$ |
| Formula [IV-b], $R^{53} = R^{54} = CH_3$ | $SO_3^-$ | $NH_2$ | H | $SO_3^-$ | $NH_2$ | H | $H_3N^+(CH_2)_4N^+H_3$ |
| Formula [IV-b], $R^{53} = R^{54} = CH_3$ | $SO_3^-$ | $NH_2$ | H | $SO_3H$ | $NH_2$ | H | Rosin anmmonium |
| Formula [IV-b], $R^{53} = R^{54} = H$ | $SO_3^-$ | $NH_2$ | H | $SO_3H$ | $NH_2$ | H | $H_3N^+(CH_2)_6NH_2$ |
| Formula [IV-b], $R^{53} = H, R^{54} =$ phenyl | $SO_3^-$ | OH | $OCH_3$ | $SO_3H$ | OH | $OCH_3$ | $(C_4H_9)_4N^+$ |

The colorant can be 0.01 to 12 parts by weight in an embodiment. The colorant can be 9 parts by weight or less in another embodiment, 6 parts by weight or less in another embodiment, 4 parts by weight or less in another embodiment, 1.5 parts by weight or less in another embodiment, 1.0 parts by weight or less, 0.5 parts by weight or less in another embodiment, 0.3 parts by weight or less in another embodiment, as the thermoplastic resin is 100 parts by weight. The colorant can be 0.05 parts by weight or more in another embodiment, 0.1 parts by weight or more in another embodiment, 0.15 parts by weight or more in another embodiment as the thermoplastic resin is 100 parts by weight.

Additional Colorant

The bezel and optionally the housing can comprise an additional colorant in another embodiment. The additional colorant can be selected from the group consisting of a perinone dye, an azo dye and a mixture thereof in an embodiment. The additional dye can be used in addition to the anthraquinone dye and/or the amine salt of an anthraquinone dye to adjust the color in another embodiment. The perinone dye and the azo dye could transmit the light of infra-red region at 800 to 1200 nm in an embodiment.

The perinone dye can comprise a chemical structure of formula [V] in an embodiment.

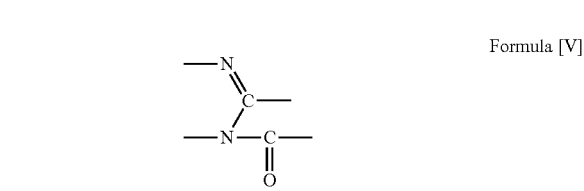

Formula [V]

The perinone dye can be represented by formula [VI] in another embodiment.

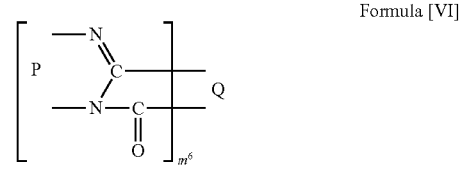

Formula [VI]

wherein P and Q, which may be the same or different, are independently constituent units which can be represented by the following formula [VI-a], [VI-b] or [IV-c].

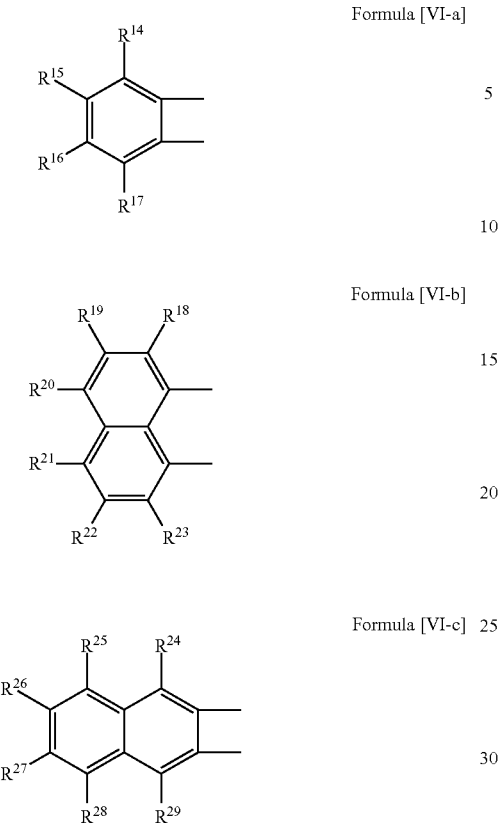

Formula [VI-a]

Formula [VI-b]

Formula [VI-c]

wherein $R^{14}$ to $R^{29}$, which may be the same or different, are independently an atom or a group selected from the group consisting of H, halogen atom such as Cl, Br, alkyl group having 1 to 18 carbon atoms, alkoxy group having 1 to 18 carbon atoms, aralkyl group and aryl group; and $m^6$ is 1 or 2.

The perinone dye can be selected from the group consisting of C.I. Solvent Orange 60, 78, C.I. Solvent Red 135, 162, 178, 179, C.I. Violet 29, C.I. Pigment Orange 43, C.I. Pigment Red 149 and a mixture thereof in another embodiment.

Examples of the perinone dye of formula [VI] are illustrated in Table 4 below.

TABLE 4

| P | Q |
|---|---|
| Formula [VI-b]: $R^{18} = R^{19} = R^{20} = R^{21} = R^{22} = R^{23} = H$ | Formula [VI-a]: $R^{14} = R^{15} = R^{16} = R^{17} = H$ |
| Formula [VI-b]: $R^{18} = R^{19} = R^{20} = R^{21} = R^{22} = R^{23} = H$ | Formula [VI-a]: $R^{14} = R^{15} = R^{16} = R^{17} = Cl$ |
| Formula [VI-b]: $R^{18} = R^{19} = R^{20} = R^{21} = R^{22} = R^{23} = H$ | Formula [VI-c]: $R^{24} = R^{25} = R^{26} = R^{27} = R^{28} = R^{29} = H$ |
| Formula [VI-a]: $R^{14} = R^{15} = R^{16} = R^{17} = H$ | Formula [VI-b]: $R^{18} = R^{19} = R^{20} = R^{21} = R^{22} = R^{23} = H$ |
| Formula [VI-b]: $R^{18} = R^{19} = R^{20} = R^{21} = R^{22} = R^{23} = H$ | Formula [VI-c]: $R^{24} = R^{26} = R^{27} = R^{28} = R^{29} = H, R^{25} = OC_2H_5$ |
| Formula [VI-b]: $R^{18} = R^{19} = R^{20} = R^{21} = R^{22} = R^{23} = H$ | Formula [VI-a]: $R^{14} = R^{15} = R^{17} = H, R^{16} = $ benzoyl |
| Formula [VI-b]: $R^{18} = R^{19} = R^{20} = R^{22} = R^{23} = H, R^{21} = C_4H_9$ | Formula [VI-a]: $R^{14} = R^{17} = H$ |
| Formula [VI-b]: $R^{18} = R^{19} = R^{20} = R^{21} = R^{22} = R^{23} = H$ | Formula [VI-c]: $R^{24} = R^{26} = R^{27} = R^{28} = R^{29} = R^{25} = $ phenyl |
| Formula [VI-b]: $R^{18} = R^{19} = R^{20} = R^{21} = R^{22} = R^{23} = H$ | Formula [VI-a]: $R^{15} = R^{16} = R^{17} = H, R^{14} = Br$ |
| Formula [VI-b]: $R^{18} = R^{19} = R^{20} = R^{21} = R^{22} = R^{23} = H$ | Formula [VI-a]: $R^{15} = R^{16} = R^{17} = H, R^{14} = COOH$ |

The azo dye comprises at least one azo group (—N=N—). The azo dye can be selected from the group consisting of a monoazo dye, a disazo dye and a mixture thereof in another embodiment.

The azo dye can be selected from the group consisting of C.I. Solvent Yellow 1, 2, 3, 14, 18, 77, 97; C.I Solvent Red 1, 3, 4, 18, 19, 23, 24, 33; C. Solvent Orange 2, 3, 7; C.I. Pigment Red 40, 49, 54; C.I. Pigment Yellow 81, 83 and a mixture thereof.

The azo dye can be represented by formula [VII].

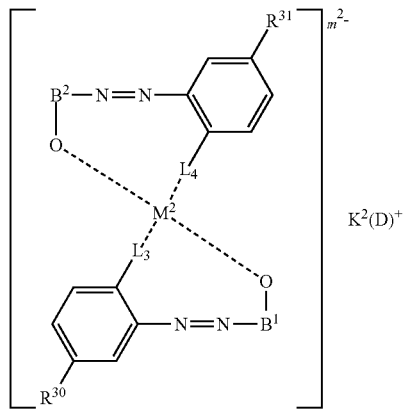

Formula [VII]

wherein $R^{30}$ and $R^{31}$, which may be the same of different, are Cl, $SO_2R^{32}$, $SO_2(-R^{33})(-R^{34})$ or H; wherein $R^{32}$ is linear or branched C1-C4 alkyl; $R^{33}$ and $R^{34}$, which may be the same or different, are independently hydrogen atom, linear or branched C1-C4 alkyl; $L_3$ and $L_4$ are independently O or COO; (D)$^+$ is hydrogen ion, cation of alkali metals, ammonium ion, cations of organic amine including aliphatic primary, secondary and tertiary amines, quaternary ammonium ion; $K^2$ is an integer, $m^2$ is 0, 1 or 2; $M^2$ is selected from metals of ionic valency from 2 to 4 (such as Zn, Sr, Cr, Al, Ti, Fe, Zr, Ni, Mn, B and Co), metal of trivalent metal such as Cu or trivalent metal such as Cr, Co, Ni, and Al; $B^1$ and $B^2$ are represented by formula [VII-a] or formula [VII-b].

Formula [VII-a]

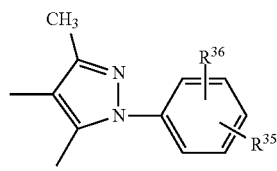

Formula [VII-b]

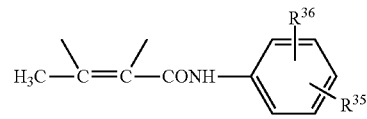

wherein $R^{35}$ and $R^{37}$, which may be the same of different, are Cl, $SO_2R^{32}$, $SO_2(-R^{33})(-R^{34})$ or H; $R^{33}$ and $R^{34}$, which may be the same or different, are independently hydrogen atom, linear or branched C1-C4 alkyl; and $R^{36}$ and $R^{38}$, which may be the same or different, are independently hydrogen atom, linear or branched C1-C18 alkyl, carboxyl, hydroxyl, C1-C18 alkoxy, amino or halogen atoms.

The cations in the above-mentioned azo dye of formula [VII] are H$^+$; cations of alkali metal, ammonium ion, cations of organic amine including aliphatic primary, secondary and tertiary amines, and quaternary ammonium ion. Suitable amines for use in producing the above-mentioned monoazo complex dyes and common in dyestuffs include aliphatic amines, alicyclic amines, alkoxyalkyl amines, amines having alkanol, diamine, amines of guanidine derivatives, and aromatic amines.

Examples of the azo dye of formula [VIII] wherein $B^1$ and $B^2$ are of the formula [VIII-a] are indicated as below formula [VIII-c].

Formula [VIII-c]

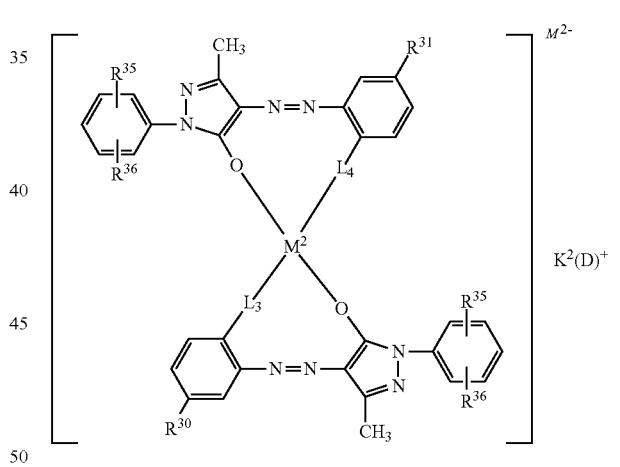

Examples of the azo dye of formula [VIII-c] are illustrated in Table 5.

TABLE 5

| $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|
| H | H | H | H | Cr | COO | COO | 1 | H$^+$ |
| Cl | Cl | SO$_2$NH$_2$ | H | Cr | O | O | 1 | H$^+$ |
| SO$_2$NH$_2$ | SO$_2$NH$_2$ | SO$_2$NH$_2$ | H | Cr | O | O | 1 | H$^+$ |
| Cl | Cl | SO$_2$NH$_2$ | H | Co | O | O | 1 | H$^+$ |
| SO$_2$NH$_2$ | SO$_2$NH$_2$ | H | H | Ni | O | O | 1 | H$^+$ |
| H | H | SO$_2$NH$_2$ | H | Cu | COO | COO | 1 | H$^+$ |
| H | H | H | H | Cr | COO | COO | 1 | C$_4$H$_9$CH(C$_2$H$_5$)OC$_3$H$_6$N$^+$H$_3$ |
| Cl | Cl | SO$_2$NH$_2$ | H | Cu | O | O | 1 | C$_{12}$H$_{25}$N$^+$H$_2$(CH$_2$CH$_2$O)$_2$H |
| Cl | Cl | SO$_2$NH$_2$ | H | Cr | O | O | 1 | Na$^+$ |
| Cl | SO$_2$NH$_2$ | H | Cl | Co | O | O | 1 | H$^+$ |

The additional colorant can be 0.01 to 3 parts by weight in an embodiment. The additional colorant can be 2 parts by weight or less in another embodiment, 1 parts by weight or less in another embodiment, 0.5 parts by weight or less in another embodiment, 0.1 parts by weight or less in another embodiment, as the thermoplastic resin is 100 parts by weight. The additional colorant can be 0.01 parts by weight or more in another embodiment, 0.02 parts by weight or more in another embodiment as the thermoplastic resin is 100 parts by weight.

There are various examples of combinations of the colorant. For instance, the colorant comprises an anthraquinone dye only in an embodiment, an anthraquinone dye and the additional dye in another embodiment, an anthraquinone blue dye, anthraquinone red dye and anthraquinone yellow dye in another embodiment, an anthraquinone violet dye and anthraquinone yellow dye in another embodiment, an anthraquinone green dye and anthraquinone red dye in another embodiment, an anthraquinone blue dye, anthraquinone red dye and anthraquinone yellow dye in another embodiment, an anthraquinone green dye, anthraquinone red dye and anthraquinone yellow dye in another embodiment, an anthraquinone blue dye, a perinone red dye and anthraquinone yellow dye in another embodiment, an anthraquinone green dye, a perinone red dye, and anthraquinone yellow dye in another embodiment, an anthraquinone green dye and an azo red dye in another embodiment.

The total amount of the colorant and the additional colorant can be 0.02 to 15 parts by weight in an embodiment. The colorant can be 11 parts by weight or less in another embodiment, 7 parts by weight or less in another embodiment, 4 parts by weight or less in another embodiment, 1.5 parts by weight or less in another embodiment, 0.5 parts by weight or less in another embodiment as the thermoplastic resin is 100 parts by weight. The black colorant can be 0.07 parts by weight or more in another embodiment, 0.09 parts by weight or more in another embodiment, 0.1 parts by weight or more in another embodiment, 0.15 parts by weight or more in another embodiment as the thermoplastic resin is 100 parts by weight.

Inorganic Filler

The bezel and optionally the housing can further comprise inorganic filler in an embodiment. The inorganic filler can improve thermal conductivity and/or strength of the molded parts. The inorganic filler can be thermal conductive filler in another embodiment. The thermal conductive filler can be selected from the group consisting of talc, kaolin, wollastonite, silica, silicon, calcium carbonate, potassium titanate, mica, magnesium oxide, calcium fluoride and a mixture thereof in another embodiment. The thermally conductive filler can be selected from the group consisting of talc, mica, kaolin and a mixture thereof in another embodiment. The bezel and optionally housing comprises no inorganic filler in another embodiment.

The inorganic filler is 1 to 80 parts by weight in an embodiment, 3 to 70 parts by weight in an embodiment, 4 to 50 parts by weight in another embodiment, 5 to 25 parts by weight in another embodiment as the thermoplastic resin is 100 parts by weight.

The inorganic filler can be a reinforcing agent in another embodiment. The reinforcing agent can be selected from the group consisting of glass fiber, carbon fiber, glass flake, glass beads and a mixture thereof in an embodiment. The reinforcing agent can be glass fiber in another embodiment.

Additive

One or more optional compounds selected from a wide variety of materials tailored for different applications of the resin compositions can be contained in the composition according to the present invention. Typically, additive compounds can include flame retardants, impact modifiers, viscosity modifiers, heat resistance improvers, lubricants, antioxidants and UV- and other stabilizers. The compositions of the present invention may have such additive compounds in such amounts that they do not harm their characteristic properties. These and other additives are used in accordance with accepted practices as understood by those having skill in the art.

Resin Composition

The thermoplastic resin and the colorant are mixed together to form a resin composition. The resin composition is molded into a shape of the bezel and/or the housing.

The thermoplastic resin can be 50 to 99.95 wt. % based on the weight of the resin composition in an embodiment. The thermoplastic resin can be 60 wt. % or more in another embodiment, 70 wt. % or more in another embodiment, 80 wt. % or more in another embodiment, 90 wt. % or more in another embodiment, 99 wt. % or more in another embodiment based on the weight of the resin composition. The thermoplastic resin can be 99.9 wt. % or less in another embodiment based on the weight of the resin composition.

EXAMPLES

The present invention is illustrated by, but is not limited to, the following examples.

Example 1

The thermoplastic resin composition was prepared with the following procedure. 100 parts by weight of PBT pellets (Crastin®, E.I. DuPont de Nemours and Co.) and 0.2 parts by weight of a colorant dye were mixed in a stainless tumble mixer with stirring for one hour. The colorant dye was a mixture of an anthraquinone blue dye (C. I. Solvent blue 87), an anthraquinone yellow dye (C. I. Solvent yellow 163) and a perinone dye (C. I. Solvent red 179). The weight ratio of the colorants was blue:yellow:red=3.8:2.3:1.5. The resin composition was then injection molded to form a plate, 16 mm wide, 16 mm long and 1 mm thick, using K50-C produced by Kawaguchi Steel K.K. The cylinder temperature was set to 250° C. Molding temperature was 60° C.

Measurement

Thermal conductivity (TC): The thermal conductivity of the molding obtained above was measured by a xenon flash apparatus (LFA 447 NanoFlash®, NETZSCH company) according to ASTM E-1461. Surface temperature (ST): The plates were exposed to 1W near-infrared laser of wave length of 940 nm for 3 seconds.

Comparative Example 1 to 5

A plate was formed in a same manner as Example 1 except for using different composition as shown in Table 1. A colorant was carbon black and additionally a thermal conductive filler (TC filler) such as talc, MgO or $CaF_2$ was added to the composition. TC and ST were measured as well as Example 1.

Results

Thermal conductivity of the plate was higher in Comparative Example (Com. Ex.) 2 to 5 where the plate comprised the TC filler than the plate in Comparative example 1 and Example (Ex.) 1 where the composition did not contain the TC filler as shown in Table 6.

However, surface temperature (ST) was lower in Example 1 using the anthraquinone dye than the other plates in Comparative Example 1 to 5 using the carbon black and the TC filler.

TABLE 6

| Composition | | Com. Ex. 1 | Com. Ex. 2 | Com. Ex. 3 | Com. Ex. 4 | Com. Ex. 5 | Ex. 1 |
|---|---|---|---|---|---|---|---|
| PBT | | 100 | 100 | 100 | 100 | 100 | 100 |
| Colorant | C-black | 0.5 | 0.7 | 0.8 | 0.8 | 0.8 | 0.0 |
| | Dye | 0.0 | 0.0 | 0.0 | 0.0 | 0.0 | 0.2 |
| TC filler | Talc | 0.0 | 33.6 | 67.2 | 0.0 | 0.0 | 0.0 |
| | MgO | 0.0 | 0.0 | 0.0 | 67.2 | 0.0 | 0.0 |
| | $CaF_2$ | 0.0 | 0.0 | 0.0 | 0.0 | 67.2 | 0.0 |
| TC (W/mK) | | 0.7 | 1.1 | 1.2 | 1.1 | 0.9 | 0.7 |
| ST (° C.) | | 359 | 251 | 223 | 217 | 252 | 200 |

Example 2, 3 and Comparative Example 6

The thermoplastic resin composition of Example 2 and Comparative Example 6 was prepared in the same manner of Example 1 and Comparative Example 1 respectively. In Example 3, the thermoplastic resin composition was prepared in the same manner of Example 1 except for increasing the dye amount to 0.3 parts by weight as shown in Table 7.

Measurement

Surface temperature (ST): The plates were exposed to 30 W light of a xenon lamp concentrated to a circular area of 2.5 mm diameter on each plates for 3 seconds. The results are shown in Table 7 as relative values when the ST of Comparative Example 6 is 100.

Results

Surface temperature (ST) was lower in Example 2 and 3 using the anthraquinone dye than Comparative Example 6 using the carbon black.

TABLE 7

| Composition | | Com. Ex. 6 | Ex. 2 | Ex. 3 |
|---|---|---|---|---|
| PBT | | 100 | 100 | 100 |
| Colorant | C-black | 0.5 | 0.0 | 0.0 |
| | Dye | 0.0 | 0.2 | 0.3 |
| ST (° C.)* | | 100 | 69 | 72 |

*Relative value when the ST of Comparative Example 6 is 100.

What is claimed is:

1. A vehicle headlight assembly comprising:
a light source,
a housing supporting the light,
a bezel equipped over the front side of the housing, and
a transparent cover being equipped over the front side of the bezel, wherein the bezel and optionally the housing comprise a thermoplastic resin and a colorant, wherein the colorant is selected from the group consisting of an anthraquinone dye, an amine salt thereof and a mixture thereof; and wherein the thermoplastic resin consists essentially of polybutylene terephthalate.

2. The vehicle headlight assembly of claim 1, wherein the anthraquinone dye is represented by the following formula [I], formula [II-a] or formula [II-b];

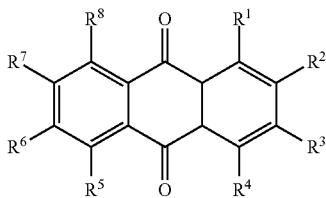

Formula [I]

wherein $R^1$ to $R^8$ is independently H, OH, $NH_2$, $OCH_3$, $OCH_3$, $CH_3NH$, $C_4H_9NH$, $C_5H_{11}NH$, Br, $NOC_2H_4NH$, methylanilino, aniline, benzoylamido, ethylanilino, cyclohexyl amido or phenyloxy.

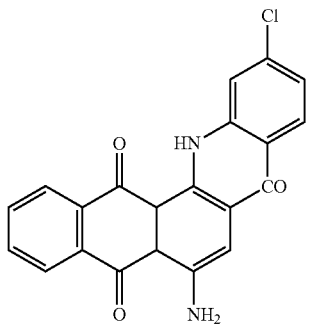

Formula [II-a]

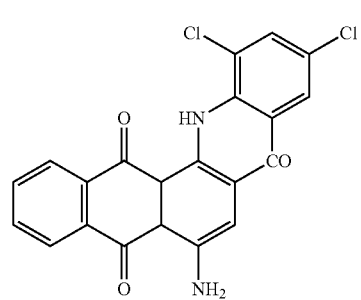

Formula [II-b]

3. The vehicle headlight assembly of claim 1, wherein the anthraquinone dye is selected from the group consisting of an anthraquinone green dye, an anthraquinone blue dye, an anthraquinone violet dye, an anthraquinone red dye, an anthraquinone orange dye, an anthraquinone yellow dye and a mixture of two or more thereof.

4. The vehicle headlight assembly of claim 3, wherein the anthraquinone green dye is selected from the group consisting of C.I. Solvent Green 3, 5, 6, 7, 19, 20, 22, 23, 24, 25, 26, 28, 29 and a mixture thereof.

5. The vehicle headlight assembly of claim 3, wherein the anthraquinone blue dye is be selected from the group consisting of C.I. Solvent Blue 11, 12, 13, 14, 16, 17, 18, 19, 20, 21, 35, 36, 40, 41, 45, 58, 59, 63, 65, 68, 69, 74, 76, 78, 79, 80, 82, 83, 84, 85, 86, 87, 90, 91, 92, 93, 94, 95, 96, 97, 98, 101, 102, 103, 104, 105, 106, 107, 108, 109, 110, 111, 112, 113, 114, 116, 119, 120, 121, 122, 123, 126, 128, 130, 132, 134, 136, 139, C.I. Vat Blue 4, 6, 11, 12, 13, 14 and a mixture thereof.

6. The vehicle headlight assembly of claim 3, wherein the anthraquinone violet dye is selected from the group consisting of C.I. Solvent Violet 11, 12, 13, 14, 15, 26, 28, 30, 31, 33, 34, 36, 37, 38, 40, 41, 42 and a mixture thereof.

7. The vehicle headlight assembly of claim 1, wherein the thermoplastic resin is 100 parts by weight and the colorant is 0.01 to 12 parts by weight.

8. The vehicle headlight assembly of claim 1, wherein the bezel and optionally the housing further comprises an additional colorant selected from the group consisting of perinone dye, an azo dye and a mixture thereof.

9. The vehicle headlight assembly of claim 8, wherein the thermoplastic resin is 100 parts by weight and the additional colorant is 0.01 to 3 parts by weight.

10. A method of manufacturing a vehicle headlight assembly comprising steps of:
   preparing a thermoplastic resin composition comprising a colorant and a thermoplastic resin that consists essentially of polybutylene terephthalate, wherein the colorant is selected from the group consisting of an anthraquinone dye, an amine salt thereof and a mixture thereof;
   forming a bezel by injection molding the resin composition;
   equipping the bezel on the front side of a housing holding a light; and
   equipping a transparent cover on the front side of the bezel.

* * * * *